J. E. HALE.
VEHICLE TIRE AND RIM.
APPLICATION FILED JUNE 6, 1911.
1,010,137.
Patented Nov. 28, 1911.
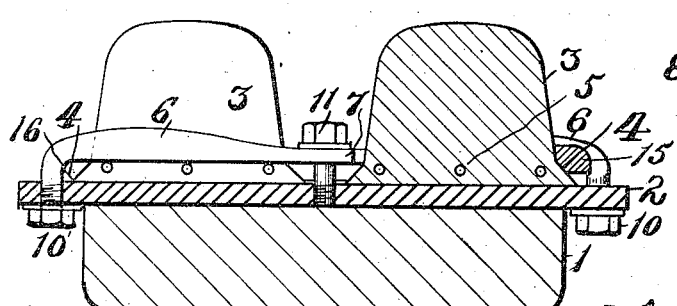
Fig. 1
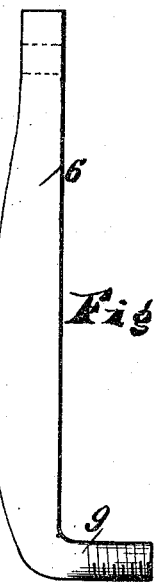
Fig. 4   Fig. 5
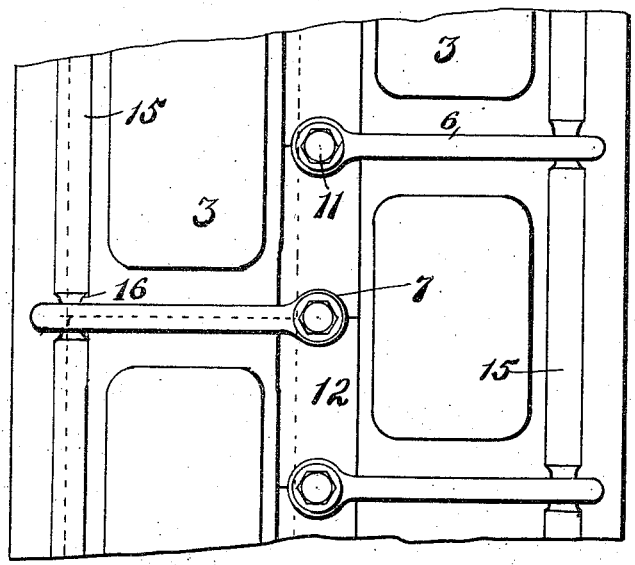
Fig. 2
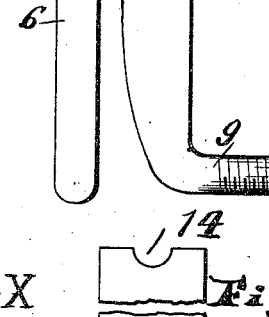
Fig. 6
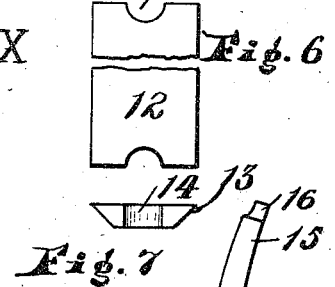
Fig. 7
Fig. 8
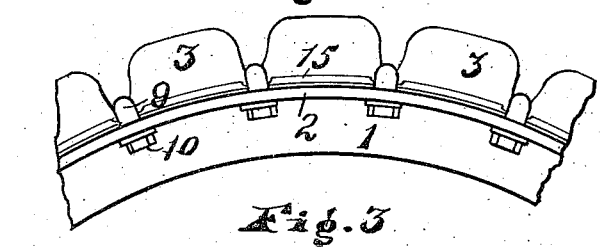
Fig. 3
Witnesses:
A. L. McClintock
A. E. Kling
Inventor
James Ellis Hale
by C. E. Humphrey
Atty

UNITED STATES PATENT OFFICE.

JAMES E. HALE, OF AKRON, OHIO, ASSIGNOR TO THE GOODYEAR TIRE AND RUBBER COMPANY, OF AKRON, OHIO, A CORPORATION OF OHIO.

VEHICLE TIRE AND RIM.

1,010,137.   Specification of Letters Patent.   Patented Nov. 28, 1911.

Application filed June 6, 1911.  Serial No. 631,626.

*To all whom it may concern:*

Be it known that I, JAMES ELLIS HALE, a citizen of the United States, residing at Akron, in the county of Summit and State of Ohio, have invented new and useful Improvements in Vehicle Tires and Rims, of which the following is a specification.

This invention relates broadly to improvements in elastic tires and rims for vehicle wheels and more particularly to those of the block tread type.

The primary object of this invention is to provide a tire composed of independently removable blocks of resilient material, together with retaining means for holding said blocks in proper position with respect to each other on a wheel rim to thereby provide transverse grooves or spaces between coadjacent blocks whereby the elasticity of the tire and its road-gripping properties are increased.

The invention contemplates a vehicle wheel provided with a rim adapted to constitute a seat for a plurality of tire-forming blocks having outwardly-projecting tread portions which are integral with or mounted on base portions which extend laterally beyond the said faces of the tread portions to provide flanges having shoulders at the junctions of the two portions of the blocks.

The invention further contemplates providing novel means for holding the blocks on the wheel-rim in such a manner that they may be easily secured in position and readily removed to permit the removal of a worn block and its replacement. The retaining means for the blocks are so constructed that when in operative position they are constantly clamped on the base portions of the blocks to hold the latter against displacement and wear and thereby increase the efficiency and life of the block by carrying out the well known rule that the effectiveness and life of an elastic block tire is increased by a constant compression or pressure applied to the base portion thereof. The arrangement of the tire-holding means being such that when in position for use it compresses or places a tension upon the base portion of each block composing the tire.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim to be hereunto appended.

In the drawings in which similar reference numerals indicate like parts in the different figures, Figure 1, is a view, in transverse section of the rim portion of a vehicle wheel having mounted thereon a tire composed of a plurality of blocks held in position by my improved device, on line X of Fig. 2; Fig. 2, is a plan view of the device shown in Fig. 1; Fig. 3, is a view in side elevation of the device shown in Figs. 1 and 2; and, Figs. 4, 5, 6, 7 and 8 are views showing various mechanisms employed for holding a tire in position on a wheel rim.

Referring to the drawings specifically, the reference numeral 1 denotes the felly of a vehicle wheel on which is mounted a comparatively wide flat felly-rim 2 provided along each side edge with a series of radial apertures, the members of each series alternating in position with respect to each other. The rim is further provided with a circumferential series of apertures arranged along its transverse central line, the central apertures being placed transversely opposite all of the apertures in both of the lateral series.

Mounted on the outer or seat-forming face of the felly rim 2 are a plurality of elastic blocks constituting the tire and each block embodies an outwardly-projecting tread portion 3 with flaring flanges 4 projecting from its base, the side edges of the lateral flanges being preferably inclined at an angle of approximately 45° with the outer face of the rim. Each of these blocks is preferably provided in the base portion thereof with one or more longitudinally-extending stiffening wires 5 extending lengthwise from end to end of each block. These blocks are customarily arranged on the outer surface of the rim in parallel series with the joints between the members of each series arranged in staggered relation or alternating with respect to the joints between the blocks of a contiguous series.

The projecting flanges at the ends of the blocks are preferably flat and are adapted to abut against each other when arranged on the felly rim 2 and in order to hold the ends of the blocks in position against movement or displacement I provide a plurality of L-shaped members 6 shown in Figs. 4 and 5 in which it will be noted that they consist of elongated bars provided with looped end portions 7 provided with apertures 8 and at their opposite ends with down-turned threaded portions 9 approximately at right angles with the main portion of the bars. These bars are positioned by inserting their threaded ends 9 in the openings along the lateral portions of the felly rim 2 and with their looped portions along the central portion of the rim. In thus positioning these bars they are so placed that they overlap the abutting ends of a pair of tread-forming blocks 3 and are held in position by means of nuts 10 on the threaded ends 9 and their inner portions are secured by means of cap-bolts 11 passing through the apertures 8 and engaging in the threaded openings along the central portion of the rim 2 and by means of the nuts 10 and the bolts 11 the bars 6 may be drawn inwardly onto the abutting ends of the blocks for compressing and holding the latter detachably in position.

In order to hold those portions of the base of the tire along the median transverse central portion of the tire I employ a plurality of plates 12 shown in Figs. 6 and 7 each consisting of a curvilinearly-formed plate having the side faces thereof beveled at 13 which are adapted to rest upon the side faces of the base portions of the blocks 3 of contiguous series. These plates are provided at their ends with semi-circular grooves 14 and are adapted to be placed between the cap-bolts 11 and under the looped portions 7 of the bars 6, the grooves 14 receiving the bolts 11 so as not to interfere with the proper manipulation and securing of the latter. It will be noted therefore that as the cap-bolts 11 are tightened up they will press inwardly on the looped portions 7 of the bars 6 and force the plates 12 against the inclined side faces of the bases of adjacent blocks for compressing the latter and holding the same firmly against the outer or seat-forming face of the rim 2.

In order to hold the opposite side faces of the tire blocks in position on the rim I employ a plurality of clamping bars 15 each consisting of a segment-shaped bar which is best shown in Fig. 8 and in cross section in Fig. 1, and having one inclined face adapted to engage the inclined lateral face of a block and having a general curvature approximately concentric with the outer face of the felly rim 2. These clamping bars are provided at their ends with reduced portions 16 which are adapted to be inserted under the bent portions of the bars 6 and of such a length that the ends of two contiguous clamping bars may be set under and retained in position by one of the transversely-extending bars 6, so that when the latter are compressed or drawn inwardly toward the outer face of the felly rim the ends of the two contiguous clamping bars 16 are simultaneously drawn in the same direction tending to compress and clamp the side faces of the blocks with which they engage.

I claim:

A vehicle wheel embodying a rim constituting a seat for a tire and provided with two series of spaced apertures, each aperture of one series being complemental to an aperture of the other series, a circumferential series of tire-forming blocks mounted on said rim, each of said blocks comprising an outwardly-projecting tread-forming portion and laterally-projecting flanges at the base thereof, the joint between the abutting flanges of contiguous blocks being approximately coincident with a line extending between two complemental apertures of different series, an L-shaped retaining bar having its shorter arm extending through one of said complemental apertures and its opposite end provided with an opening, and means extending through said opening and into the other complemental aperture arranged to draw said bar inwardly toward said rim to clamp the abutting flanges of contiguous blocks for holding them snugly against said rim.

In testimony whereof I have hereunto set my hand in presence of two subscribing witnesses.

JAMES E. HALE.

Witnesses:
C. E. HUMPHREY,
A. L. McCLINTOCK.